Dec. 2, 1958  J. S. COCKRELL  2,862,222
MOTOR VEHICLE LAUNDRY
Filed Dec. 15, 1953  5 Sheets-Sheet 1
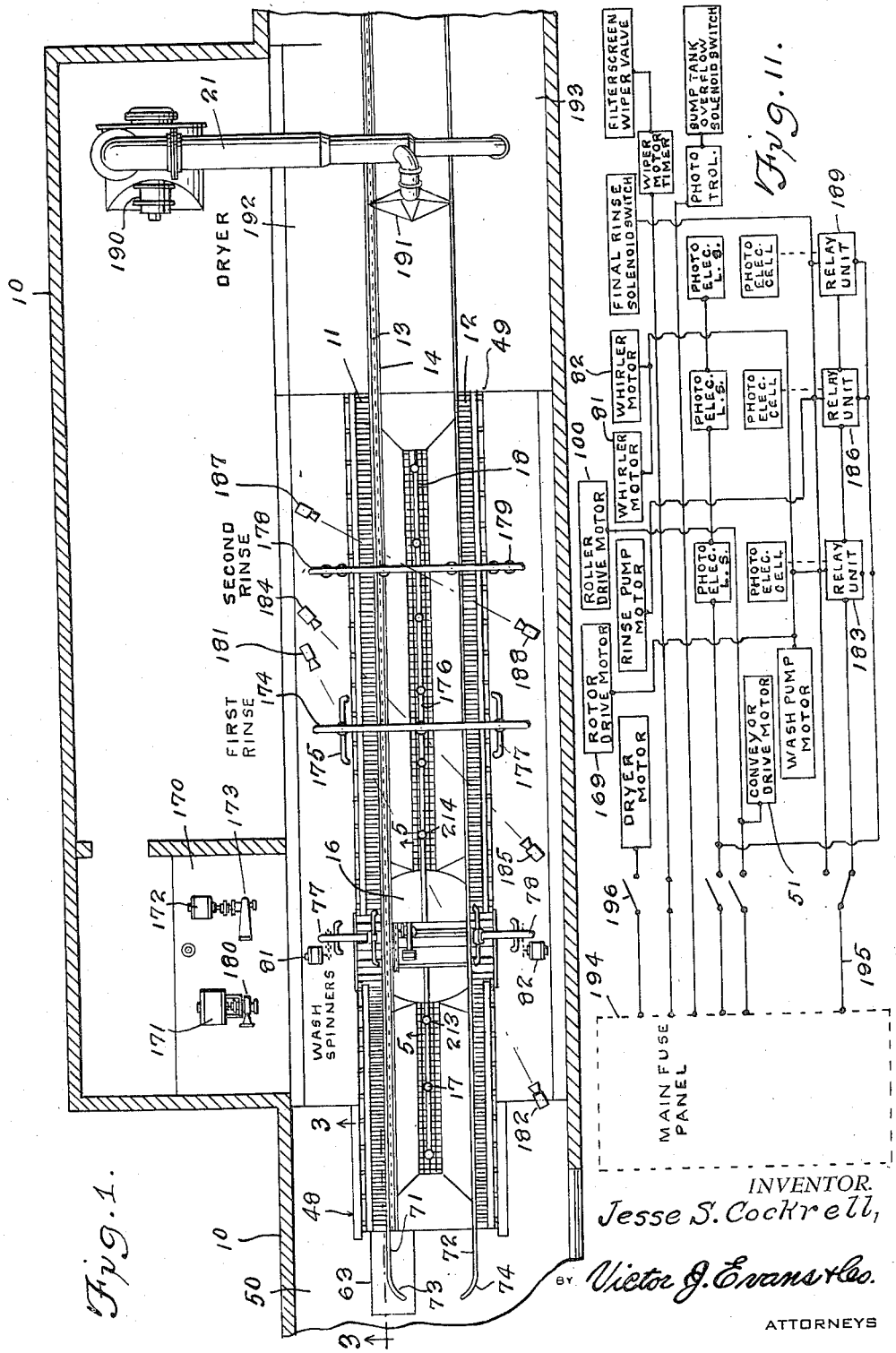
INVENTOR.
Jesse S. Cockrell,
BY Victor J. Evans & Co.
ATTORNEYS

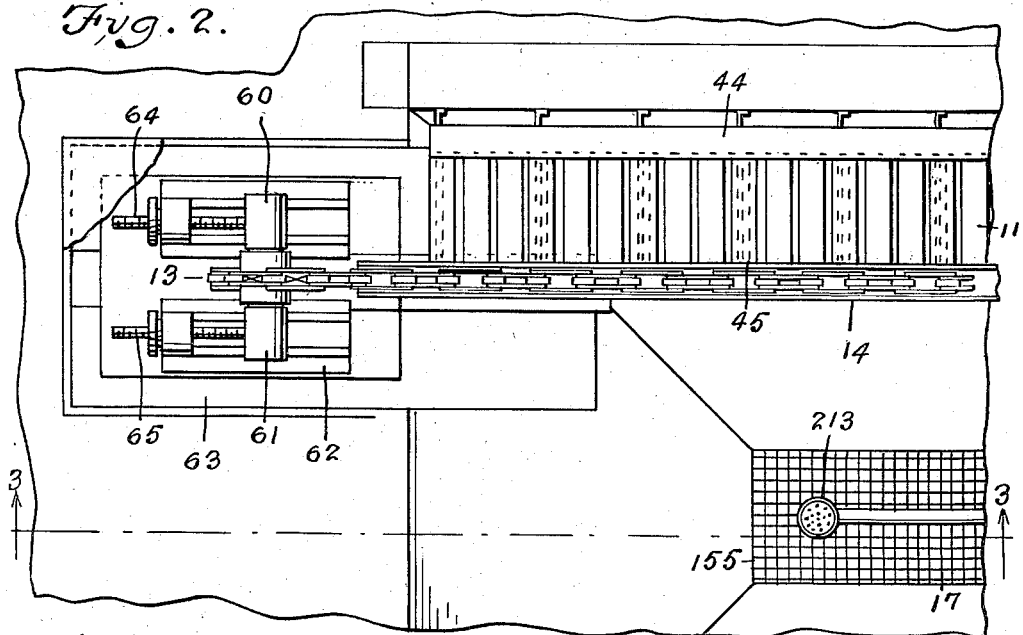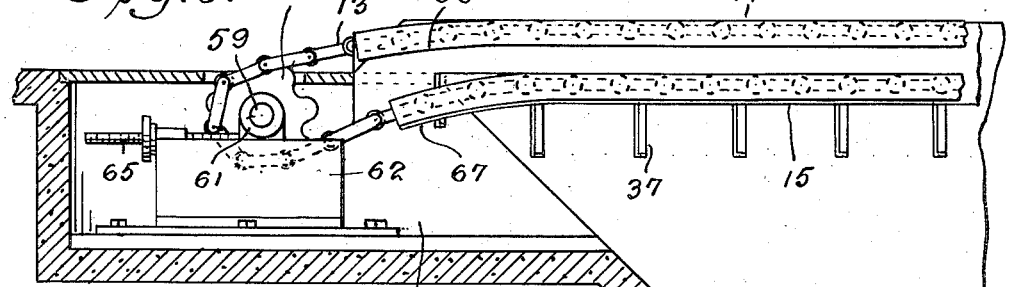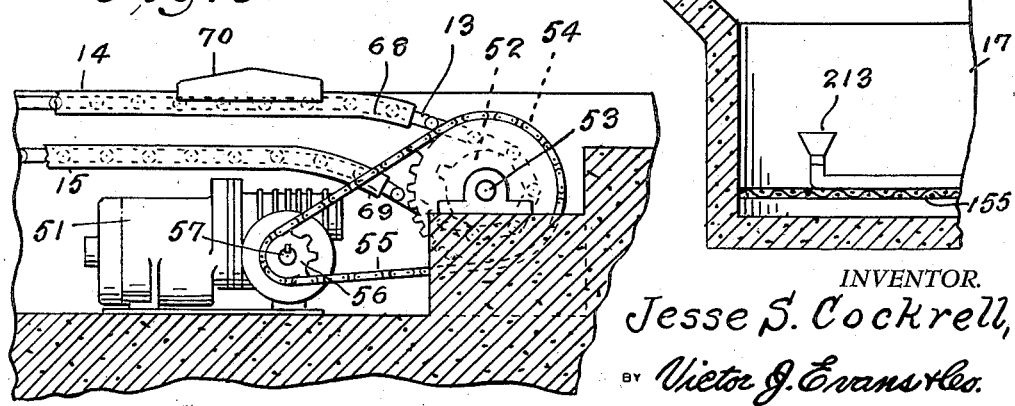

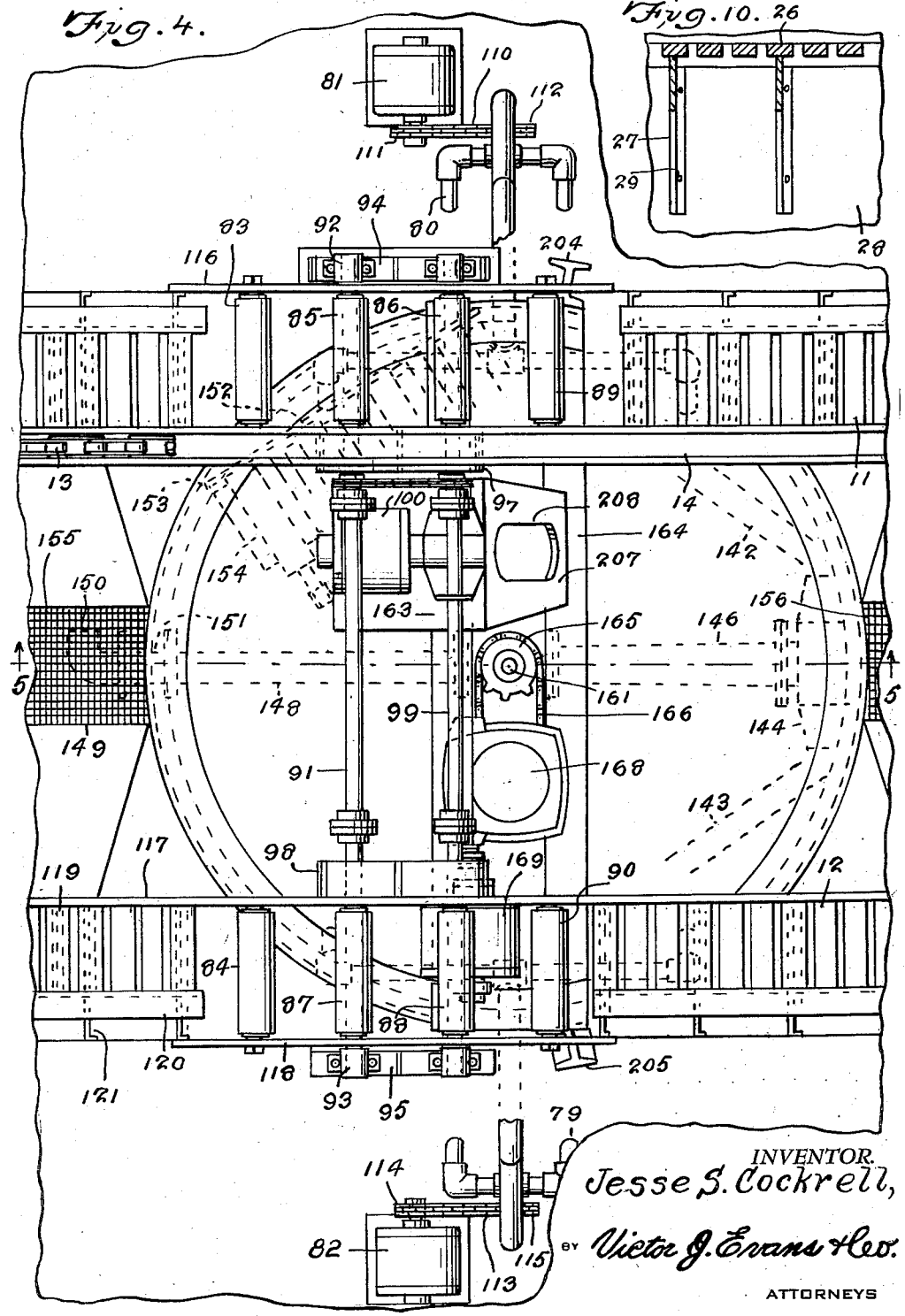

Dec. 2, 1958 J. S. COCKRELL 2,862,222
MOTOR VEHICLE LAUNDRY
Filed Dec. 15, 1953 5 Sheets-Sheet 4
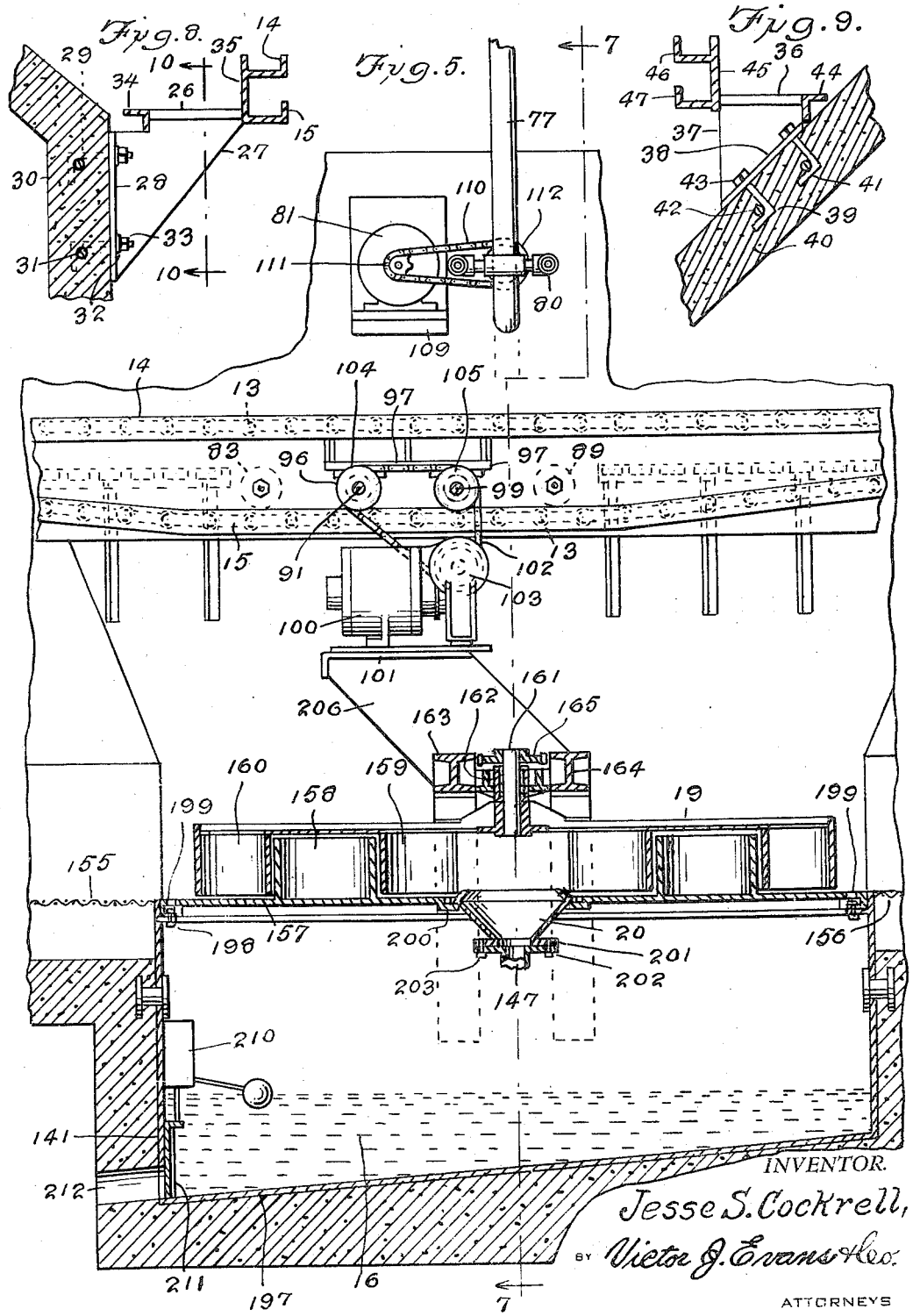
INVENTOR.
Jesse S. Cockrell,
BY Victor J. Evans & Co.
ATTORNEYS Dec. 2, 1958 J. S. COCKRELL 2,862,222
MOTOR VEHICLE LAUNDRY
Filed Dec. 15, 1953 5 Sheets-Sheet 5

INVENTOR.
Jesse S. Cockrell,
BY Victor J. Evans & Co.
ATTORNEYS

United States Patent Office 2,862,222
Patented Dec. 2, 1958

2,862,222

MOTOR VEHICLE LAUNDRY

Jesse S. Cockrell, Norfolk, Va.

Application December 15, 1953, Serial No. 398,261

5 Claims. (Cl. 15—302)

This invention relates to mechanically operating devices for washing and cleaning motor vehicles particularly of the pleasure type, and in particular an enclosure having a track for motor vehicles extended therethrough with spaced groups of nozzles extended over the track with a group adapted to spray water in combination with soft pellets of resilient material upon vehicles for washing the vehicles and other groups for spraying water on vehicles for rinsing the vehicles, and in which conveying means is provided for actuating vehicles on the track, the track being positioned over a sump providing a catch basin for receiving water sprayed upon vehicles on the track with filtering means in the sump, and with means for pumping reclaimed water, pellets, and also fresh water to the spray nozzles.

The purpose of this invention is to improve the operation of mechanically actuated motor vehicle laundries by providing power driven spinners for spraying water on the lower parts of the sides of a motor vehicle, by forcing pellets used in water sprayed over surfaces of motor vehicles for obtaining a scrubbing action into recirculating elements and by improving the filtering means whereby water used for washing motor vehicles is adapted to be recirculated and reused.

This invention is an improvement over the motor vehicle laundry disclosed in my prior patent No. 2,660,774, dated December 1, 1953, in that improvements have been made in the elements for returning the pellets to the filter, in the spraying elements and also in the wheel washing section whereby wheels are rotated as they pass power driven spraying elements.

It has been found that in mechanical devices for washing vehicles considerable water is used and for this reason it is necessary to improve the filtering means whereby water may be reused as long as possible. It has also been found that the vertical surfaces at the sides of the vehicle are more difficult to wash than the substantially horizontal surfaces of the top, hood and fenders, and furthermore, it has been found advisable to rotate the wheels in front of power driven spray devices whereby the wheels are efficiently washed in combination with side surfaces of the vehicle.

With these improvements in mind this invention contemplates an improved filtering device in combination with a sump whereby clean water passes through continuously cleaned filtering elements and is pumped to washing and rinsing sprays and also means for rotating wheels of the vehicle in the presence of sprays whereby the wheels are more efficiently cleaned.

It has also been found that the small pellets used in the wash water and which are impinged against surfaces of the vehicle are difficult to work into recirculating devices and for this reason a plurality of meshing arcuate blades are provided on a rotor with the blades positioned to coact with stationary blades so that pellets deposited upon the rotor which is positioned in a low point of a drain of the washer housing are urged into a center funnel or hopper through which they are conveyed to the washing sprays.

The object of this invention is, therefore, to improve mechanically actuated washers for cleaning motor vehicles by providing means for feeding pellets ejected with washing sprays into recirculating devices.

Another object of the invention is to provide, in a motor vehicle laundry, an efficent filtering means to permit reusing water ejected from the spraying elements.

Another object of the invention is to provide means for rotating wheels of a vehicle to facilitate complete washing of the wheels.

A further object of the invention is to provide an improved motor vehicle laundry in which the parts are of comparatively simple and economical construction.

With these and other objects and advantages in view the invention embodies a washing enclosure positioned to receive a motor vehicle, spaced treads providing a track positioned to receive wheels of a motor vehicle extended on opposite sides of a drain trench in the longitudinal center of the enclosure, power driven rollers positioned in the treads at one point of the track for rotating wheels of a vehicle on the track, a sump having a filter therein positioned below the track, a pellet feeding rotor positioned on the sump, freely operating spray nozzles in combination with power driven spinning nozzles adjacent the sump and positioned to spray water and pellets upon the body of a motor vehicle positioned on the track and rinsing spray nozzles spaced from the washing spray nozzles and also adapted to spray water on a vehicle positioned on the treads of the track.

The invention also includes a device for blowing air over the vehicle for drying as the vehicle leaves the washing and rinsing steps.

Other features and advantages of the invention will appear from the following description taken in connection with the drawings, wherein:

Figure 1 is a sectional plan through the enclosure illustrating the relative positions of the parts.

Figure 2 is a detail showing a plan view of the track in combination with which an endless chain is provided with the track on the opposite side and also with other parts broken away.

Figure 3 is a detail showing a longitudinal section through the starting end of the washer taken on line 3—3 of Figure 1 with the parts shown on an enlarged scale, and illustrating the take-up end of an endless chain for moving vehicles through the laundry.

Figure 3a is a view similar to that shown in Figure 3, showing a longitudinal section through the opposite or driving end of the endless chain.

Figure 4 is a sectional plan, also with the parts shown on an enlarged scale showing the intermediate part of the washer, the rotor being omitted to better illustrate other parts, and illustrating the sump and also the power driven rollers for rotating the wheels of the vehicle.

Figure 5 is a detail taken on line 5—5 of Figure 4 showing a longitudinal section through the intermediate part of the washer.

Figure 8 is a detail showing a bracket for mounting bars forming treads of the track on a vertical surface.

Figure 9 is a similar detail showing a bracket for mounting the bars on a sloping surface.

Figure 10 is a detail showing a section taken on line 10—10 of Figure 8.

Figure 11 is a diagrammatic view illustrating the arrangement of a typical control panel with circuits to the various motors for operating the parts of the washer extended from the panel.

Figures 6, 7:
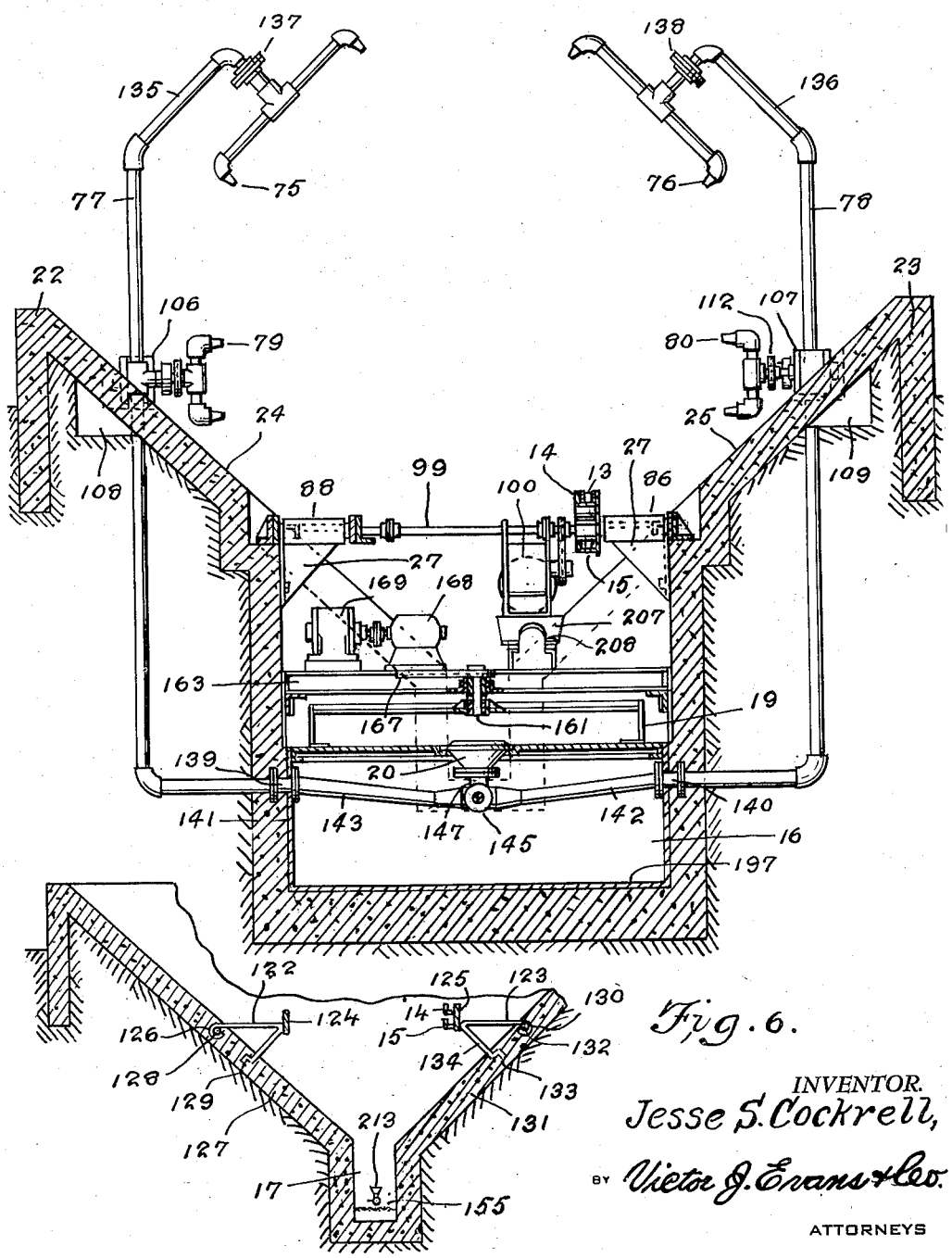
Figure 6 is a cross section through the lower portion of the device illustrating a modification wherein the treads of the track are formed with triangular-shaped rods, the ends of which are embedded in the concrete of the sloping sides of the trench.
Figure 7 is a cross section through the device taken on line 7—7 of Figure 5 showing the washing spray nozzles.

Referring now to the drawings wherein like reference characters denote corresponding parts the improved auto or motor vehicle washer of this invention includes a housing 10 having suitable side walls and a cover, a track including spaced treads 11 and 12, and endless chain 13 positioned at the inner edges of the treads 11 and mounted to travel on an upper rail 14 and a lower rail 15, a sump 16 positioned to receive water from a drain trench 17 at one side and a corresponding trench 18 on the opposite side, a rotor 19 mounted above the sump 16 and positioned to feed pellets to a funnel or hopper 20 in the center of the sump 16, suitable power driven rollers 85, 86, 87, and 88 and idler rollers 83, 84, 89 and 90 positioned in the treads 11 and 12, washing spray units 75, 76, 79, and 80 and rinsing spray units 175, 176, 177, and 179 mounted to spray water upon vehicles on the treads 11 and 12 and a drying unit as indicated by the numeral 21 for blowing air over vehicles passing from the treads 11 and 12.

The auto or motor vehicle laundry of this invention is built in a substantially enclosed housing with the housing extended upwardly from side walls 22 and 23 of a trench, V-shaped in cross section having sloping side surfaces 24 and 25 that extend upwardly from the trenches 17 and 18 in the intermediate parts of the housing.

The treads 11 and 12 upon which the wheels of a vehicle travel are formed with spaced parallel bars mounted on the upper edges of triangularly shaped plates and the plates are secured to the walls of the trench with anchor bolts extended into the concrete, as illustrated in Figures 8 and 9.

The track mounting illustrated in Figure 8 is used on straight sections of the wall of the trench as provided at the sides of the sump 16 and a triangularly shaped mounting is used on the sloping walls extended from the sump to the ends of the track.

As illustrated in Figure 8 bars 26, forming treads, are supported at spaced points with brackets formed with triangularly shaped plates 27 and the vertical edges of the plates are provided with flanges 28 through which anchor bolts 29 extend. Hooks 30 on the inner ends of the bolts extend over reinforcing rods 31 and the outer ends of the bolts are provided with nuts 32 and washers 33. In this design the inner ends of the bars 26 are secured to an angle bar 34 and the outer ends to a plate 35 upon which the rails 14 and 15 of the track for the chain are positioned.

In the design illustrated in Figure 9 bars 36, similar to the bars 26 are supported at spaced points with brackets formed with plates 37 and flanges 38 on the inner edges of the plates are secured by anchor bolts 39 to the concrete wall 40 with hooks 41 on the inner ends of the bolts extended over reinforcing rods 42 and with nuts 43 threaded on the outer ends of the bolts. The inner ends of the bars 36 are secured to an angle iron 44 and the outer ends to a plate 45 on which tracks 46 and 47 similar to the rails 14 and 15, are carried.

It will be understood that with the treads 11 and 12 formed as illustrated on Figures 8 and 9 they may be extended along the sides of the trench of the laundry and, as illustrated in Figure 1 the treads may extend from a point 48 to a point 49.

With the treads formed in this manner a vehicle, entering the end 50 of the laundry is driven inwardly until low parts of the vehicle are gripped by the chain 13 and the chain carries the vehicle through the laundry with the wheels rolling on the treads 11 and 12.

The chain 13, as illustrated in Figures 2, 3 and 3a is driven by a motor 51 at the discharge end of the housing wherein the chain is trained over a sprocket 52 on a shaft 53 and the shaft is driven by a chain 55 that is trained over a sprocket 54 on the shaft 53 and also over a sprocket 56 on a shaft 57 of a reduction unit, driven by the motor, as shown in Figure 3a.

The opposite end of the chain 13 is trained over a sprocket on shaft 59, journaled in take-up bearings 60 and 61 on a stand 62 in a well 63 at the end of the trench and the take-up bearings 60 and 61 are provided with adjusting screws 64 and 65.

As illustrated in Figure 3 the rails 14 and 15 through which the endless chain 13 travels are provided with arcuate sections 66 and 67, respectively, at the entrance of the laundry and, as illustrated in Figure 3a the rails are provided with arcuate sections 68 and 69 at the discharge end of the laundry. A release plate 70 is also provided on the upper rail 14, at the discharge end of the laundry whereby parts of a vehicle in engagement with the chain are elevated to release the vehicle from the chain as the chain moves downwardly to the sprocket 52.

The entrance end of the laundry is also provided with guard rails 71 and 72 and these rails are provided with arcuate ends 73 and 74 to facilitate guiding a vehicle whereby the wheels register with the treads 11 and 12.

In the first stage of the operation of the improved laundry of this invention wherein the vehicle is positioned over the sump 16 dirt is washed from the surface of the vehicle with water at comparatively low pressure, and having a cleaning material such as a water softener or mild soap therein and also containing a soft texture of crushed sponge rubber or rubber pellets. The water cleaning material and pellets are sprayed from upper and lower rotating nozzles, as illustrated in Figure 7, wherein upper spray nozzles 75 and 76, rotatably mounted on the upper ends of pipes 77 and 78, are rotated by water passing therethrough, and lower spinning nozzles 79 and 80 which are also rotatably mounted on the pipes 77 and 78, are rotated at comparatively high speed with motors 81 and 82, respectively.

The pipes 77 and 78, and the fittings of the spray nozzles and other parts thereof are, preferably, of welded construction.

Upon reaching the first stage of the laundry the front wheels of a vehicle pass over rollers 83 and 84 to spaced power driven rollers 85 and 86 on one side and 87 and 88 on the other whereby the wheels spin around subjecting the entire surfaces of the wheels to the power driven spray nozzles 79 and 80. From the power driven rollers the wheels pass over rollers 89 and 90 to the bars or treads 11 and 12.

The rollers 85 and 87 are mounted on a shaft 91 which is journaled in bearings 92 and 93 on chocks 94 and 95 at the ends and also in bearings 96 which extend downwardly from similar chocks 97 and 98 at the inner surfaces of the treads. The rollers 86 and 88 are mounted on a similar shaft 99 that is journaled in similar bearings and, as illustrated in Fig. 5 the shafts 91 and 99 are driven by a motor 100 on a bracket 101 with an endless chain 102 that is trained over a sprocket 103 of a reduction gear of the motor and also over a sprocket 104 on the shaft 91 and a sprocket 105 on the shaft 99.

With the rollers 85, 86, 87 and 88 driven by the motor 100 the wheels of a vehicle traveling on the treads are rotated whereby entire surfaces of the wheels are subjected to the cleaning sprays of the spinners 79 and 80.

The spinning sprays 79 and 80 are journaled in fittings 106 and 107 which are mounted in the pipes 77 and 78 and with the spinner heads driven by sleeves journaled in the fittings, the heads are adapted to be rotated with the motors 81 and 82 which are positioned in recesses 108 and 109 in the concrete walls of the laundry.

As illustrated in Fig. 4 the motor 81 is operatively connected to the sleeve of the spinner 80 with a chain 110 that is trained over a sprocket 111 on the motor shaft and also over a sprocket 112 in the sleeve of the spinner head. The spinner or spray head 79 is driven by the motor 82 with a chain 113, similar to the chain 110 and the chain 113 is trained over similar sprockets 114 and 115, also as shown in Figure 4.

The idler rollers 83 and 89 are journaled in a plate, similar to the plate 35 upon which the rails 14 and 15 of the chain track are mounted and the opposite ends are journaled in a plate 116 positioned on the outer side of the tread. The rollers 84 and 90 are journaled in a similar plate 117 at one side of the tread and also in a plate 118 at the opposite side of the tread. The tread on this side of the trench may be formed with bars 119 that are positioned between the plates 117 and an angle iron 120, similar to the angle irons 34 and 44 of the design shown in Figures 8 and 9. The angle irons and bars 119 are secured to brackets 121, similar to the brackets 27 and 37.

In the design illustrated in Figure 6, treads, such as the treads 11 and 12 are formed with bars 122 and 123 with a plate 124 extended across the extended edges of the bars 122 and with the rails 14 and 15 carried by a plate 125 on the extended ends of the rods 123.

The ends of the upper portions of the bars 122, which are indicated by the numeral 126 are embedded in the sloping wall 127 at one side of the trench with the ends secured by a reinforcing rod 128 and the ends 129 of the diagonally disposed sections of the rods are also embedded in the concrete. The ends of the horizontal portions of the rods 123, which are indicated by the numeral 130 are embedded in the sloping concrete wall 131 with the ends extended around reinforcing rods 132 and the ends 133 of the diagonally disposed sections 134 are also embedded in the concrete.

The rotating spray nozzles 75 and 76 are journaled on the upper ends of inwardly extended sections 135 and 136 of the pipes 77 and 78 with swiveled joints 137 and 138 respectively and with the tips of the nozzles tilted in opposite directions, water flowing through the spray heads under pressure causes the heads to rotate, similar to the action of lawn sprayers. It will be understood, however, that water may be supplied to and sprayed through the spray nozzles by other suitable means.

The lower ends of the pipes 77 and 78 are connected to nipples 139 and 140 in the wall 141 of the sump 16 and, as indicated by the dotted lines 142 and 143, in Figure 4, connections from the nipples extend to a mixing fitting 144 at one side of the sump and which is connected to a venturi fitting 145 below the funnel shape fitting through the gradually enlarging tubes 146.

The spray nozzles 75, 76, 79 and 80, in addition to spraying water, spray pellets of rubber or other suitable resilient material, the pellets being drawn from the funnel shape hopper 20 through a nipple 147 to the fitting 145 by suction created by liquid supplied to the fitting 145 through a pipe 148, the extended end of which extends through the wall 141 of the sump and into a trench 149 wherein the extended end 150 of the tube is adapted to be connected to a pump or other means for recirculating water. The pipe 148 is connected to a nipple 151 that is mounted in the wall of the sump. It will be understood, however, that suitable means may be provided for recirculating water from a filter compartment 152 at one side of the sump to the fitting 145 and to the spray nozzles. The compartment 152 is provided with a wall 153 on which filter elements 154, as illustrated in my prior Patent No. 2,792,121 dated May 14, 1957, are mounted.

The pellets, after being sprayed against the surfaces of the vehicle, to facilitate cleaning the surfaces, drop downwardly into trenches 17 and 18 and are washed over screens 155 and 156 in the trenches to the sump, the screens depositing the pellets upon a perforated cover plate 157 from the upper surface of which arcuate blades 158 extend. The pellets are conveyed by inner arcuate blades 159 which extend upwardly from the plate 157 and outer arcuate blades 160, which depend from the under surface of the rotor 19 as shown in my prior Patent No. 2,792,121 dated May 14, 1957, and which straddle the intermediate arcuate blades 158 which extend upwardly from the plate 157 to the funnel or hopper 20 at the center of the sump 16.

The rotor 19 is mounted on a vertically disposed shaft 161 that is journaled in a bearing 162 between spaced support beams 163 and 164 and the shaft is provided with a sprocket 165 over which a chain 166 is trained. As shown in Figure 7, the chain is also trained over a sprocket 167 on a shaft extended from a reduction gear 168 which is driven by a motor 169.

As illustrated in Figure 1 the housing is provided with a pump pit or housing 170 in which is a motor 171, driving a pump 180 for recirculating the water from the sump with the pellets therein through the spray nozzles to the washing stage of the laundry, and a motor 172 for driving a pump 173 that supplies water from the compartment 152 of the sump to the pipe 174 of the first rinse, the pipe 174 being provided with rotating spray nozzles 175, 176 and 177 which are similar to the spray nozzles 75 and 76 wherein water under pressure supplied to the nozzles causes the nozzles to rotate.

The pipe 178 of the second or final rinse and which is provided with stationary nozzles 179 is connected to suitable means for supplying fresh or clean water to the motor vehicle laundry.

Also as illustrated in Figure 1 the first and second rise units follow the washing unit positioned over the sump whereby as the vehicle approaches the dryer 21 substantially all cloudy water is washed therefrom and in the final stage the surface of the vehicle is clean and dry.

The pump 180 which is driven by the motor 171 is positioned with the discharge thereof connected to the fitting 150 at one side of the sump and with the suction side connected to the compartment 152 whereby filtered water is used in the first washing stage. The discharge of the pump 173 is connected to the pipe 174 by suitable means and the suction side of the pump 173 is connected by suitable means to a filtered water compartment 152 of the sump.

*Operation*

In the first washing stage water is drawn from the sump 16 by a pump 180 with pellets drawn from the hopper 20 mixed with the water and after being sprayed over a vehicle the wash water with the pellets therein returns from the trenches 17 and 18 to the perforated plate 157 where the pellets are scraped toward the center by the arcuate plates 158, the pellets dropping into the hopper 20 from which they are recirculated with water from the sump by the pump 180.

In the next or first rinse stage filtered water is drawn by the pump 173 from the compartment 152 of the filter in the sump and delivered under pressure to the pipe 174 on which the spray nozzles 175, 176, and 177 are positioned. The rinse water of the second stage also returns to the sump through the trenches.

In the third stage or second rinse service or city water is supplied directly to the pipe 178 whereby clean fresh water is sprayed by spray nozzles on the pipe over the surface of the vehicle.

After the third stage or final rinse the vehicle passes through the dryer 21 by which heated air is sprayed through the nozzle 191 and dryer hoods 192 and 193 over the surface of the vehicle.

The motor vehicle laundry of this invention is also provided with a series of electric eyes with a photoelectric light 181 positioned to coact with a photo-electric cell 182 to actuate a relay 183 to start the washing operation as a motor vehicle reaches a position over the sump; also a photo-electric light 184 that is positioned to coact with the photo-electric cell 185 for actuating a relay 186 to complete a circuit to the motor 172 of the first rinse as the vehicle intercepts the light line passing through the position of the first rinse; and also a photo-electric light 187 that is positioned to coact with a photo-electric cell 188 to actuate a relay 189 to open a solenoid actuated valve for supplying water to the second or final rinse pipe 178. The photo-electric lights and cells may be positioned at suitable points and may be connected to relays by suitable means.

After the final rinse the vehicle passes to dryer 21 which is actuated by a motor 190 and which is provided with a discharge nozzle 191 and dryer hoods 192 and 193.

The motors, pumps, and other electrical devices are connected to a control panel 194 with suitable circuits, as indicated by the numeral 195 and with suitable manually actuated switches 196 in the circuits whereby the laundry is adapted to be set to operate automatically or manually.

The details of the sump 16 and rotor 19 mounted above the sump are illustrated in my above referred to Patent No. 2,792,121 dated May 14, 1957, however, as shown in Figure 5 the sump is provided with a sloping base 197 and the cover plate 157 is supported, at the outer edge with an annular rim 198 that is channel shaped in cross section and that is secured to the inner surface of the wall 141 of the sump. The cover 157 is provided with perforations 199 and the inner edge is positioned to rest upon an annular ring 200 extended from the hopper 20, the lower end of which is provided with a flange 201 to which a flange 202 of the nipple 147 is secured with bolts 203.

The beam 163 and 164 that support the motors 100 and 169 above the sump are carried by the upper ends of vertically disposed struts 204 at one end and 205 at the opposite end.

The motor 100, which is mounted on the bracket 101 is supported in an offset position, as illustrated in Figure 5 with angularly disposed plates 206 and with a reinforcing plate 207, the intermediate portion of which is provided with an opening 208.

In the final stages the multiple fine sprays remove all traces of dirty water or smears, and the fresh clean water of the final sprays replenishes the water of the laundry, replacing the dirty water that flows to a drain.

The amount of water in the sump is controlled by a float actuated switch 210 which closes a circuit to a solenoid actuated valve 211 that opens a drain 212.

The dirty water is washed from the drain trenches 17 and 18 with spray nozzles 213 and 214 which are distributed along the trenches and which wash the pellets over the perforated plates or screens 155 and 156, and slush the dirt and gravel below the perforated plates to the perforated plate 157 on the sump, whereby the dirt is washed into the lower part of the sump and the pellets carried to the rotor 19 which regulates the supply of pellets and a cleaning mixture, such as mild soap, or other water softener supplied to the eductor or hopper 20 in the upper part of the sump.

With the parts assembled in this manner a motor vehicle entering the end 50 of the housing is driven upon the treads 11 and 12 until parts of the vehicle are gripped by the chain 13 and as the vehicle is carried through the housing the surface thereof is washed, rinsed, and dried, as hereinbefore described. The fragmentary diagram or flow sheet in Figure 11 is only suggestive and is used only to illustrate the sequence of operations. The parts noted in the rectangles of the diagram are illustrated in applicant's prior Patent No. 2,660,744, and it will be understood that each part is grounded.

It will be understood that modifications, within the scope of the appended claims, may be made in the design and arrangement of the parts without departing from the spirit of the invention.

What is claimed is:

1. In a motor vehicle laundry, the combination which comprises an elongated trench, substantially V-shaped in cross section having upwardly and outwardly sloping side walls, a track carried by said side walls and positioned above the lower part of the trench, a sump in the lower part of the trench and positioned in the intermediate part thereof, a compartment divided from the sump and positioned therein, a filter positioned between the sump and compartment for filtering water from the sump for reuse, a perforated cover plate on the sump, beams positioned above the cover plate, a hopper positioned in the cover plate and adapted to receive pellets and liquid employed in cleaning a vehicle, a rotor rotatably mounted in the beams and positioned above the cover plate for feeding pellets from the trench to the hopper, an endless chain mounted in the track for moving a vehicle having wheels on the track with the wheels positioned to roll on the track, means for spraying material from the hopper over a vehicle positioned on the track, means for spraying material from the compartment in the sump over a vehicle on the track, and means for spraying clean water over a vehicle on the track for rinsing said vehicle.

2. In a motor vehicle laundry, the combination which comprises an elongated trench, substantially V-shaped in cross section having upwardly and outwardly sloping side walls, a track carried by said side walls and positioned above the lower part of the trench, a sump in the lower part of the trench and positioned in the intermediate part thereof, a compartment divided from the sump and positioned therein, a filter positioned between the sump and compartment for filtering water for reuse from the sump, a perforated cover plate on said sump, beams positioned above the cover plate, a hopper extended through the cover plate and adapted to receive pellets and liquid employed in cleaning a vehicle, a rotor rotatably mounted in the beams above the cover plate for feeding pellets from the trench into said hopper, an endless chain mounted in the track for moving a vehicle having wheels on the track with the wheels positioned to roll on the track, means for spraying material from the hopper over a vehicle positioned on the track for washing the vehicle, means for spraying filtered material from the compartment in the sump over a vehicle on the track for rinsing the vehicle, means for spraying clean water over a vehicle on the track for finally rinsing the vehicle, means for rotating wheels of the vehicle as the vehicle travels along said track, and means for spraying material on the wheels as the wheels are rotated.

3. In a motor vehicle laundry, the combination which comprises an elongated trench, substantially V-shaped in cross section having upwardly and outwardly sloping side walls, a track carried by said side walls and positioned above the lower part of the trench, a sump in the lower part of the trench and positioned in the intermediate part thereof, a compartment divided from the sump and positioned therein, a filter positioned between the sump and compartment for filtering water from the sump for reuse, a perforated cover plate on said sump, beams positioned above the cover plate for supporting operating parts of the laundry, a hopper extended through the cover plate and positioned to receive pellets and liquid employed in cleaning a vehicle, a rotor rotatably mounted above the cover plate for feeding pellets from the trench into said hopper, an endless chain mounted in the trench for moving a vehicle having wheels with the wheels positioned to roll on said track, spinning motor driven spray nozzles connected by tubes to the hopper for spraying material from the hopper and compartment of the sump over the vehicle on the track for washing the vehicle, means for rotating wheels of the vehicle as the vehicle is washed, means for spraying material from the filter compartment of the sump over the vehicle for rinsing the vehicle, means for spraying clear water over the vehicle also for rinsing the vehicle, and means for drying the vehicle.

4. In a motor vehicle laundry, the combination which comprises an elongated trench, substantially V-shaped in cross section having upwardly and outwardly sloping side walls, a track carried by said side walls and positioned above the lower part of the trench, a sump in the lower part of the trench and positioned in the intermediate part thereof, a compartment divided from the sump and positioned therein, a filter positioned between the sump and compartment, a perforated cover plate on said sump, beams positioned above the cover plate for supporting operating parts of the laundry, a hopper extended through the cover plate, and positioned to receive pellets washed from the trench and also adapted to receive pellets and liquid employed in cleaning a vehicle, a rotor rotatably mounted above the cover plate for feeding pellets from the trench into said hopper, an endless chain mounted in the track for moving a vehicle having wheels on the track with the wheels positioned to roll on the track, spinning motor driven spray nozzles connected by tubes to the hopper for spraying material from the hopper and compartment of the sump over a vehicle on the track for washing the vehicle, tubes connecting the hopper to the spraying means, means for rotating the wheels of the vehicle as the vehicle is washed, means for spraying material from the compartment of the sump over the vehicle providing the first rinsing of the vehicle, means for spraying clear water over the vehicle also for rinsing the vehicle, means for drying the vehicle, and photoelectric cells positioned to actuate relays for actuating the spraying devices as a vehicle moving on the track intercepts rays of light between photoelectric lights and said cells.

5. In a motor vehicle laundry, the combination which comprises an elongated trench, substantially V-shaped in cross section having upwardly and outwardly sloping side walls, a track carried by said side walls and positioned above the lower part of the trench, a sump in the lower part of the trench and positioned to receive materials from the trench by gravity, a compartment divided from the sump and positioned therein, a filter positioned between the sump and compartment, a perforated cover plate on said sump, means positioned above the cover plate for supporting operating parts of the device, a hopper positioned to receive pellets and liquid employed in cleaning a vehicle, a horizontally disposed rotor having outer and inner arcuate blades positioned to coact with the stationary arcuate blades on the cover plate for feeding materials from the trench into said hopper, means for rotatably mounting the rotor in the beams, an endless chain mounted in the track for moving a vehicle having wheels thereon on the track with the wheels positioned to travel on the track, spinning motor driven spray nozzles connected by tubes to the hopper for spraying material from the hopper and sump over a vehicle on the track for washing the vehicle, means for rotating the wheels of the vehicle as the vehicle is washed, means for spraying filtered material from the compartment of the sump over the vehicle for rinsing the vehicle, means for spraying clear water over the vehicle for finally rinsing the vehicle, means for drying the vehicle, and means for actuating the spraying devices as the vehicle on the track reaches the washing and also the rinsing positions.

References Cited in the file of this patent

UNITED STATES PATENTS

| | | |
|---|---|---|
| 1,651,045 | Smith | Nov. 29, 1927 |
| 1,907,411 | Timoney | May 2, 1933 |
| 1,909,869 | Randrup | May 16, 1933 |
| 1,934,494 | Gillespie | Nov. 7, 1933 |
| 2,312,186 | Paddock et al. | Feb. 23, 1943 |
| 2,660,744 | Cockrell | Dec. 1, 1953 |
| 2,719,529 | Wells | Oct. 4, 1955 |
| 2,732,846 | Berezny | Jan. 31, 1956 |

FOREIGN PATENTS

| | | |
|---|---|---|
| 504,185 | Great Britain | Apr. 17, 1939 |